(12) United States Patent
Chang

(10) Patent No.: US 8,279,733 B2
(45) Date of Patent: Oct. 2, 2012

(54) DYNAMIC WRITE STRATEGY MODIFICATION METHOD AND APPARATUS

(75) Inventor: Po Wei Chang, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 1111 days.

(21) Appl. No.: 11/463,672

(22) Filed: Aug. 10, 2006

(65) Prior Publication Data

US 2007/0047415 A1 Mar. 1, 2007

Related U.S. Application Data

(60) Provisional application No. 60/712,975, filed on Aug. 31, 2005.

(51) Int. Cl.
*G11B 7/0045* (2006.01)

(52) U.S. Cl. .................. 369/59.12; 369/53.34

(58) Field of Classification Search .... 369/47.49–47.53, 369/53.25–53.27, 53.31, 53.34, 59.11–59.12, 369/116

See application file for complete search history.

(56) References Cited

U.S. PATENT DOCUMENTS

| | | | |
|---|---|---|---|
| 6,636,468 B2 | 10/2003 | Salmonsen et al. | |
| 6,650,607 B1 * | 11/2003 | Kando et al. | 369/47.51 |
| 6,664,526 B2 * | 12/2003 | Yokoi | 369/59.19 |
| 6,813,107 B1 * | 11/2004 | Lee | 369/47.53 |
| 6,845,071 B2 * | 1/2005 | Shoji et al. | 369/47.53 |
| 7,006,420 B1 * | 2/2006 | Hsu et al. | 369/59.12 |
| 7,215,615 B2 | 5/2007 | Kwon | |
| 2001/0007546 A1 * | 7/2001 | Lee et al. | 369/47.53 |
| 2004/0095862 A1 * | 5/2004 | Nakajima et al. | 369/47.28 |
| 2006/0083135 A1 * | 4/2006 | Minemura | 369/47.51 |
| 2006/0262692 A1 * | 11/2006 | Yu et al. | 369/59.11 |
| 2007/0047417 A1 * | 3/2007 | Chu et al. | 369/59.12 |

FOREIGN PATENT DOCUMENTS

| | | | |
|---|---|---|---|
| JP | 62175948 A | | 8/1987 |
| JP | 2002230769 A | * | 8/2002 |

OTHER PUBLICATIONS

Machine-Assisted Translation of JP 2002230769 A.*
English abstract of JP62175948, pub. Aug. 1, 1987.

* cited by examiner

*Primary Examiner* — Nathan Danielsen
(74) *Attorney, Agent, or Firm* — Thomas|Kayden

(57) ABSTRACT

The invention relates to write strategy modification, and in particular, to dynamic write strategy modification. A dynamic write strategy modification apparatus comprises a measurement module, a write strategy development module, and a write laser module. The measurement module measures a plurality of different parameters. The write strategy development module calculates or chooses an optimal parameter from the plurality of different parameters and modifies a default strategy to generate a modified write strategy. The write laser module drives to write data onto an optical disc. A write strategy modification will be repeated until writing is finished.

16 Claims, 7 Drawing Sheets

DYNAMIC WRITE STRATEGY MODIFICATION METHOD AND APPARATUS

CROSS REFERENCE TO RELATED APPLICATION

This application claims the full benefit and priority of provisional U.S. patent application Ser. No. 60/712,975, filed Aug. 31, 2005, entitled "Dynamic Write Strategy Modification Method and Apparatus", and incorporates the entire contents of the application herein.

BACKGROUND

The invention relates to write strategy modification, and in particular, to dynamic write strategy modification.

A write strategy is a significant factor of data writing quality of an optical disc drive. The write strategy table is utilized to store a plurality of write strategies. Before writing data to the optical disc, a specific write strategy is chosen from the write strategy table according to a disc identification (ID). However, the chosen write strategy is not always optimal during writing. The major causes are: (a) the material are different in the inner area and the outer area of the optical disc; (b) different disc manufacturer or different optical discs but using the same ID; (c) the mechanism is tilted or the optical pick-up efficiencies are different in the inner area and the outer area of the optical disc; (d) write strategy variation caused by environment temperature; and (e) variations from driver IC and optical pick-up. Hence a dynamic write strategy modification method is necessary to modify the current write strategy during writing.

Some dynamic write strategy modification methods are disclosed to increase the data writing quality. For example, during the writing process, the optical disc drive pauses writing and checks the write quality, and then modifies the write strategy according to the write quality. However, how to modify the write strategy according to the write quality is never mentioned.

SUMMARY

An object of the invention is to provide a dynamic write strategy modification method comprising: writing data onto a disc according to a plurality of default write strategies, each default write strategy corresponding to a pattern combination; stopping writing and measuring a writing quality index of the pattern combination of the wrote data; adjusting the default write strategies of the pattern combinations to generate a plurality of modified write strategies according to the writing quality indices; resuming writing with the modified write strategies to write data.

Another object of the invention is to provide a dynamic write strategy modification method. The method comprises: writing a normal data according to a default parameter of a default write strategy; writing a plurality of short data according to a plurality of different parameters of the default write strategy, respectively; stopping and jumping back to read information in the plurality of short data, respectively, to choose an optimal parameter; modifying the default write strategy according to the optimal parameter to generate a modified write strategy; linking to continue writing according to the modified write strategy.

A further object of the invention is to provide a dynamic write strategy modification method. The method comprises: writing normal data and short data according to a default parameter and one of a plurality of different parameters, respectively, of the default write strategy repeatedly until all the different parameters have been tried; choosing an optimal parameter from the plurality of different parameters; modifying the default write strategy according to the optimal parameter to generate a modified write strategy; linking to continue writing according to the modified write strategy.

Yet another object is to provide a dynamic write strategy modification apparatus comprising a measurement module, a write strategy development module, and a write laser module. The measurement module measures a plurality of different parameters. The write strategy development module calculates or chooses an optimal parameter from the plurality of different parameters and modifies a default strategy to generate a modified write strategy. The write laser module is driven to write data onto an optical disc. A write strategy modification will be repeated until writing is finished.

DESCRIPTION OF THE DRAWINGS

The following detailed description, given by way of example and not intended to limit the invention solely to the embodiments described herein, will best be understood in conjunction with the accompanying drawings, in which.

DESCRIPTION

A detailed description of the invention is provided in the following. The write strategy for writing data on a disc comprises a plurality of parameters. Some are pattern dependent and some are pattern independent. The pattern dependent parameters comprise rising and falling time; the pattern independent parameters comprise write power, overdrive power ratio, rough delay, and cooling time. These parameters are not always optimal parameters and need to be modified during writing. A detailed description is provided in the following.

Figure 1:
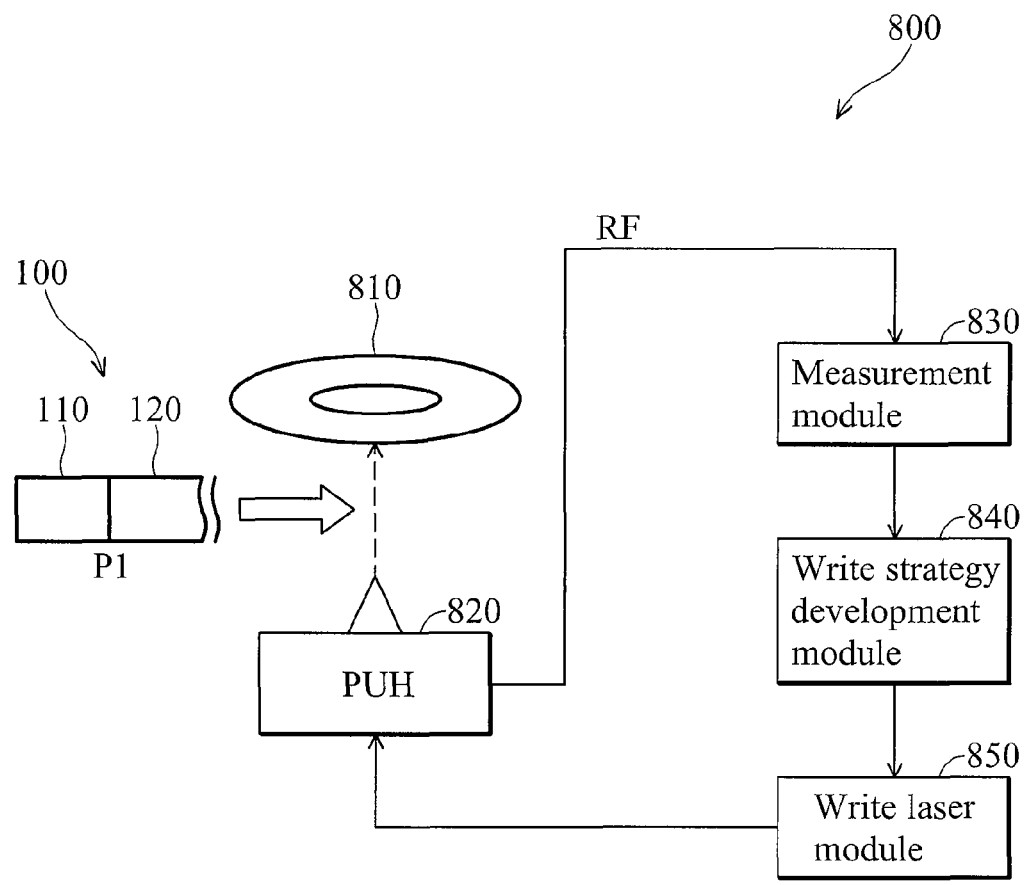
FIG. 1 is a block diagram of an optical disc writing system according to an embodiment of the invention.

Please refer to FIG. 1 which is a block diagram of an optical disc writing system 800 according to a first embodiment of the invention. The optical disc writing system 800 comprises a disc 810, a pick-up head (PUH) 820, a measurement module 830, a write strategy development module 840, and a write laser control module 850. The disc 810 is a writable writing media, e.g. DVD+-RW/DVD+-R. During writing, the measurement module 830 measures the quality index according to the feedback signal from the PUH 820. The write strategy development module 840 chooses an optimal parameter according to the quality index, and modifies a default strategy WXR_I to generate a modified write strategy WXR_II. The write laser control module 850 controls the PUH 820 to write data onto the disc 810 according to the modified write strategy. The write strategy modification will be repeated in the optical disc writing system 800 until writing is finished.

The write strategy modification method in this embodiment modifies some pattern dependent parameters (e.g. rising and falling time) of the write pulse for various land/pit pattern combinations. The optical system 800 writes a segment of data 110 (e.g. normal data or test pattern) into the disc according to a write strategy WXR_I, halts writing at a predetermined point P1, reads back a sliced RF signal RF_I from the data 110 to modify the write strategy WXR_I (e.g. rising and falling time), and continues writing another segment data 120 to the disc from the point P1 according to a new write strategy WXR_II, which is the modified write strategy WXR_I. The read back sliced signal RF_II from the data 120 is then similar to an ideal RF signal RF_IDEAL. Detailed description of write strategy modification is provided in the following.

Figure 2:
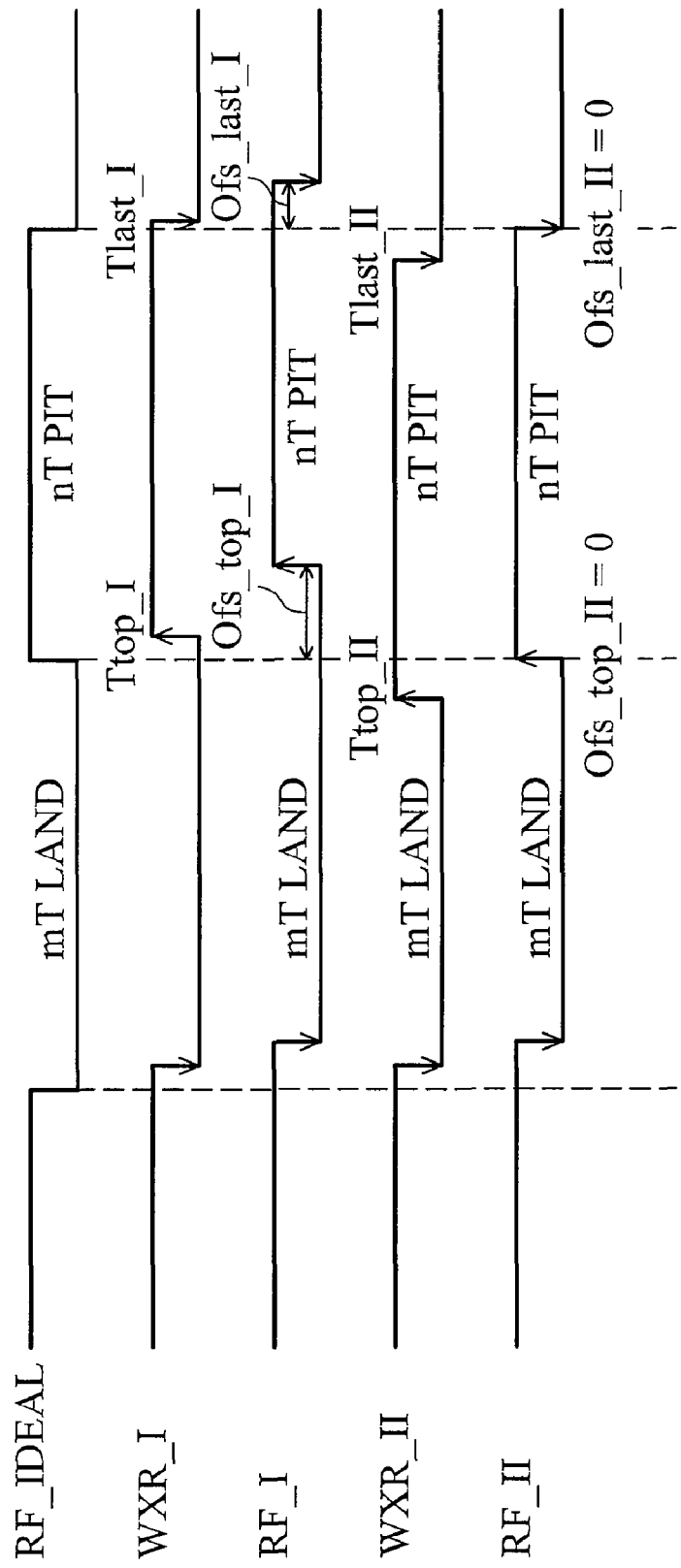
FIG. 2 shows a waveform diagram of the ideal RF signal, the sliced RF signals, and the write strategies.
Figure 3:
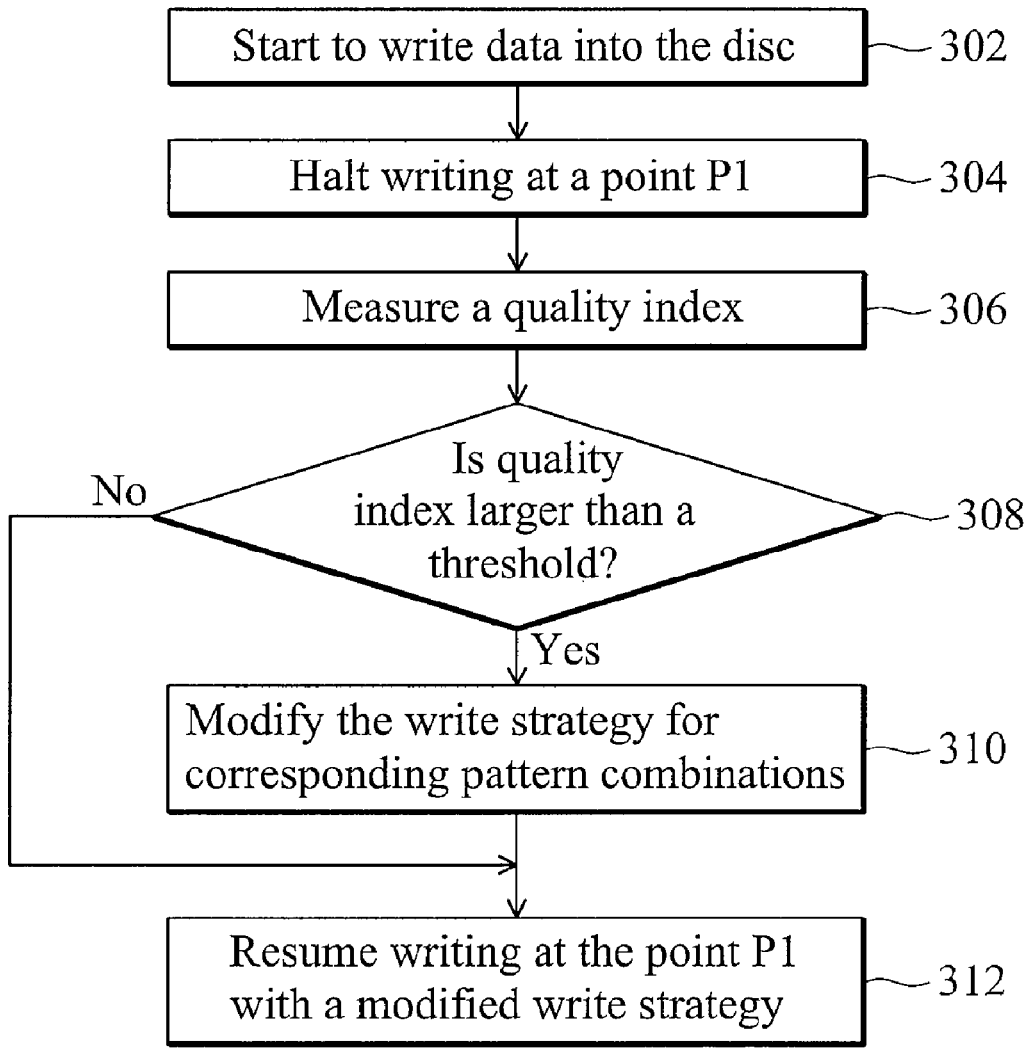
FIG. 3 is a flow chart of the dynamic write strategy modification method according to the first embodiment of the invention.

Please refer to FIG. 2. FIG. 2 shows a waveform diagram of the ideal RF signal RF_IDEAL, the sliced RF signals RF_I and RF_II, and the write strategies WXR_I and WXR_II for a specified (m Land, n Pit) pattern combination wherein the variables m and n are both positive integers. The pattern combination can be (m Pit, n Land) or (m Land, n Pit). Please note that each pattern combination comprises patterns that are at least larger than 3 T, and the 3 T~5 T patterns are commonly seen. When applied in blu-ray technology, 2 T pattern should be also included. In other words, not deviations of all pattern combinations need to be measured. However, at least combinations of short patterns (e.g. 3 T-5 T) need to be measured. Compared to the ideal RF signal RF_IDEAL with the sliced RF signal RF_I, there is an edge deviation Ofs_top_I in a rising edge and another edge deviation Ofs_last_I in a falling edge. In order to compensate for these differences, the write strategy WXR_II is utilized to modify the write strategy WXR_I. After modification, compared to the ideal signal RF_IDEAL with the sliced RF signal RF_II, the rising edge difference Ofs_top_II and the falling edge difference Ofs_last_II are both equal to zero. In other words, the sliced RF signal RF_II is almost equal to the ideal signal RF_IDEAL. Taking the rising edge compensation as an example, a rising time Ttop_I is modified to be another rising time Ttop_II. The rising time Ttop_II is determined as follows.

$$Ttop\_II - Ttop\_I = T_{diff} = X * Ofs\_top + Y$$

Wherein X and Y are tunable variables. Please note that the edge deviations must be measured repeatedly to obtain mean edge deviations in order to enhance experimental accuracy. Please note that, beside the mean edge deviations, the present invention could also use the mean length deviations, edge deviations in rising and falling edge, PI error, or DC/DD jitter as the quality index to modify the write strategy. Please refer to FIG. 1, FIG. 2 and FIG. 3 at the same time. FIG. 3 is a flow chart of the dynamic write strategy modification method according to the first embodiment of the invention. A detailed description is provided in the following.

Step 302: Begin writing data to the disc.
Step 304: Halt writing at a point P1.
Step 306: Measure a quality index, such as mean length deviations, edge deviations in rising and falling edge, PI error, or DC/DD jitter, for specified (Land, Pit) and (Pit, Land) pattern combinations.
Step 308: If the quality index is larger than a threshold, proceed to step 310; otherwise, go to step 312;
Step 310: Modify the write strategy for corresponding pattern combinations.
Step 312: Resume writing at the point P1 with a modified write strategy.

Figure 4:
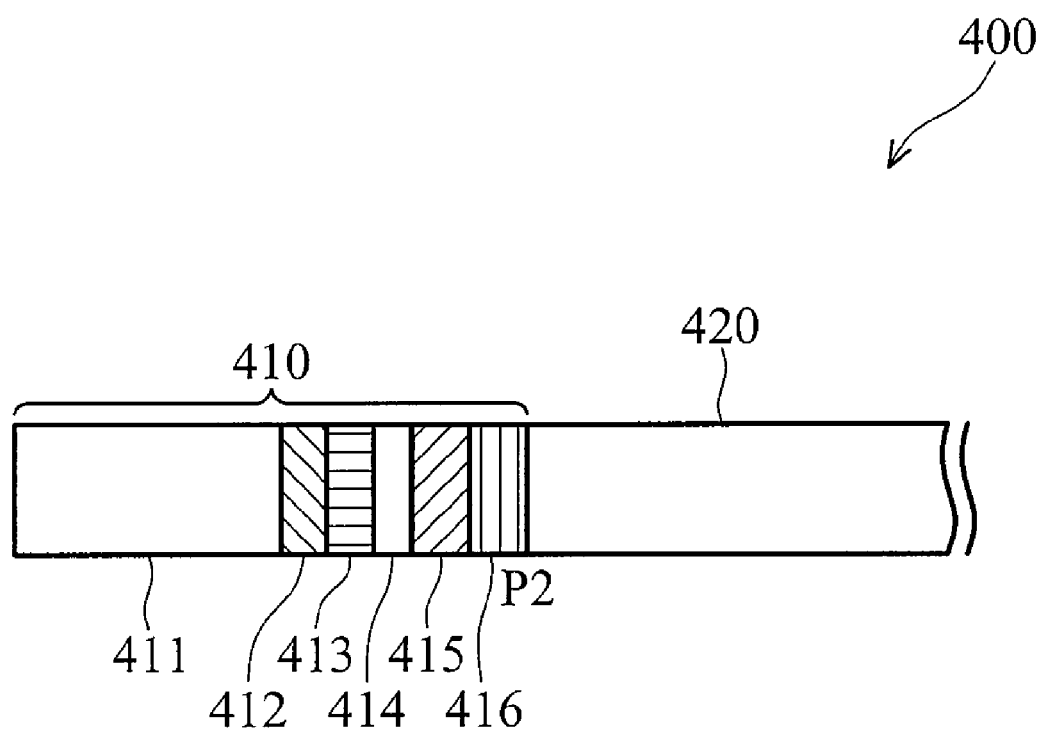
FIG. 4 is another schematic diagram of a writing data segment being written to a disc of the dynamic write strategy modification method according to a second embodiment of the invention.

Please refer to FIG. 4. FIG. 4 is another schematic diagram of a writing data segment 400 being written to a disc 810 of the dynamic write strategy modification method according to a second embodiment of the invention. The write strategy modification method of this embodiment modifies some pattern independent parameters (e.g. write power, overdrive power, rough delay, cooling time). An optical system 800 first writes a segment of data 410 (e.g. normal data or test pattern) to the disc according to a default write strategy WXR_I, halts writing at a point P2, reads back a sliced RF signal RF_I from the data 410 to modify the write strategy WXR_I, and continues to write another segment of data 420 into the disc at the point P2 according to a new write strategy WXR_II, which is the modified write strategy WXR_I. Detailed description of write strategy modification is provided in the following.

Taking the overdrive (OD) power as an example, when writing data 410, the optical system first writes the data 411 by utilizing a default OD power ratio OD_DEFAULT and then writes a plurality of short data 412, 413, 414, 415, 416 by utilizing different OD power ratios OD_1, OD_2, OD_3, OD_4, OD_5, respectively. After writing the plurality of short data (412~416), the optical system halts writing at point P2 to read back the jitter values J_1, J_2, J_3, J_4, J_5 from the plurality of short data (412~416) and then finds a minimum value in these jitter values (J_1~J_5). For example, if the jitter value J_3 is the minimum, the optical system then determines to utilize the corresponding OD power ratio OD_3 to replace the default OD power ratio OD_DEFAULT. In other words, the optical system continues to write the data 420 at point P2 by utilizing the modified OD power ratio, which is equal to OD_3. Please note that, beside the jitter value, the present invention could use some other quality index, such as the mean edge deviations, the mean length deviations, edge deviations in rising and falling edge, PI error, or DC/DD jitter to modify the write strategy parameters.

Figure 5:
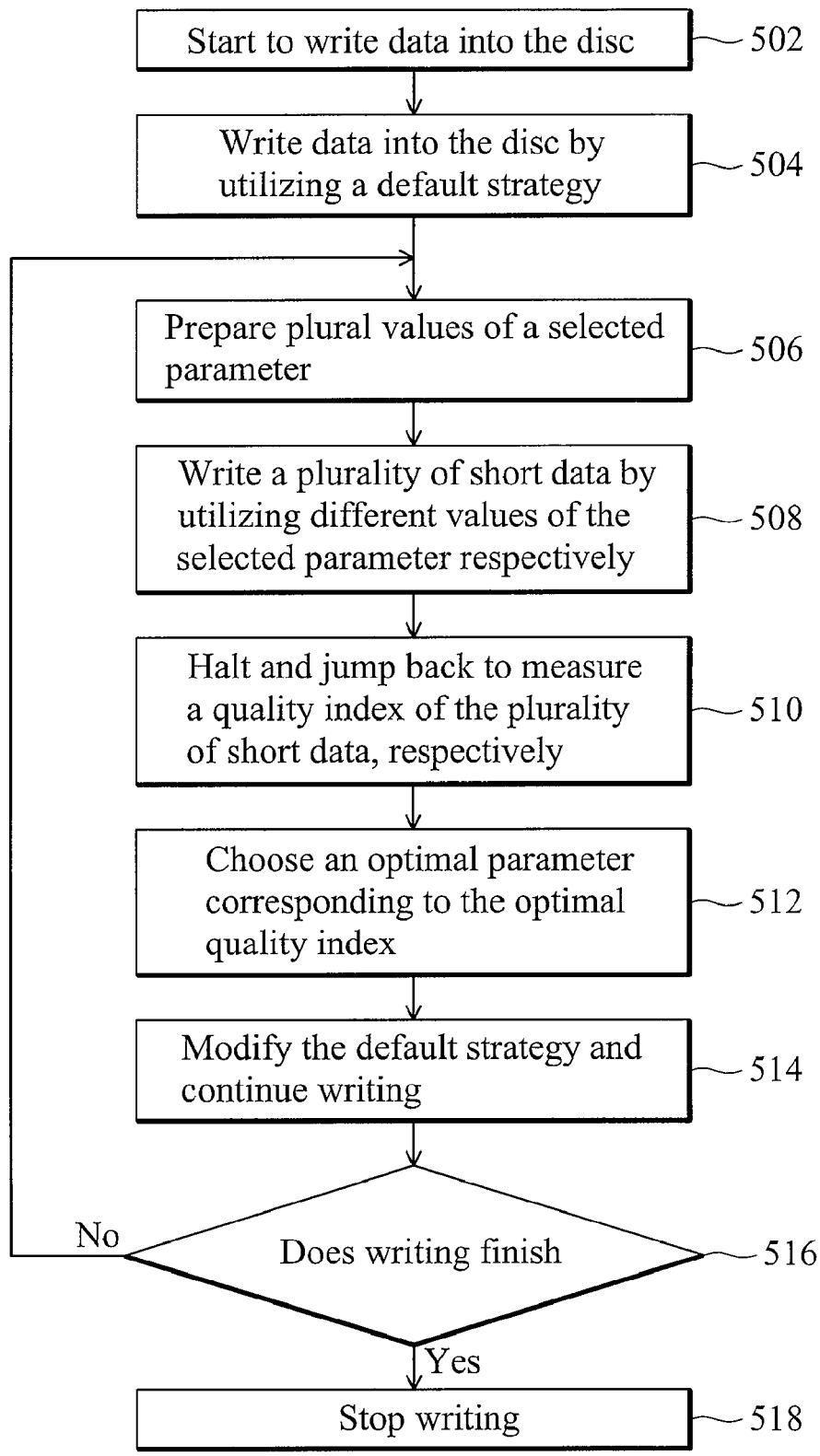
FIG. 5 is a flow chart of the dynamic write strategy modification method according to the second embodiment of the invention.

Please refer to FIG. 4 and FIG. 5 at the same time. FIG. 5 is a flow chart of the dynamic write strategy modification method according to the second embodiment of the invention. The detailed description is shown in the following.

Step 502: Begin writing data to the disc.
Step 504: Write data into the disc by utilizing a default strategy WXR_I.
Step 506: Prepare plural values of a selected parameter (e.g. OD power ratios OD_1, OD_2, OD_3, OD_4, OD_5).
Step 508: Write a plurality of short data (412~416) by utilizing different values of the selected parameter (OD_1~OD_5) respectively.
Step 510: Halt and jump back to measure a quality index (e.g. jitter value) of the plurality of short data (412~416), respectively.
Step 512: Choose an optimal parameter corresponding to the optimal quality index (e.g. a minimum jitter value).
Step 514: Modify the default strategy WXR_I according to the optimal parameter and continue writing by utilizing the modified write strategy WXR_II.
Step 516: If writing is finish, proceed to step 518; otherwise, go to step 506.
Step 518: Stop writing.

Figure 6:
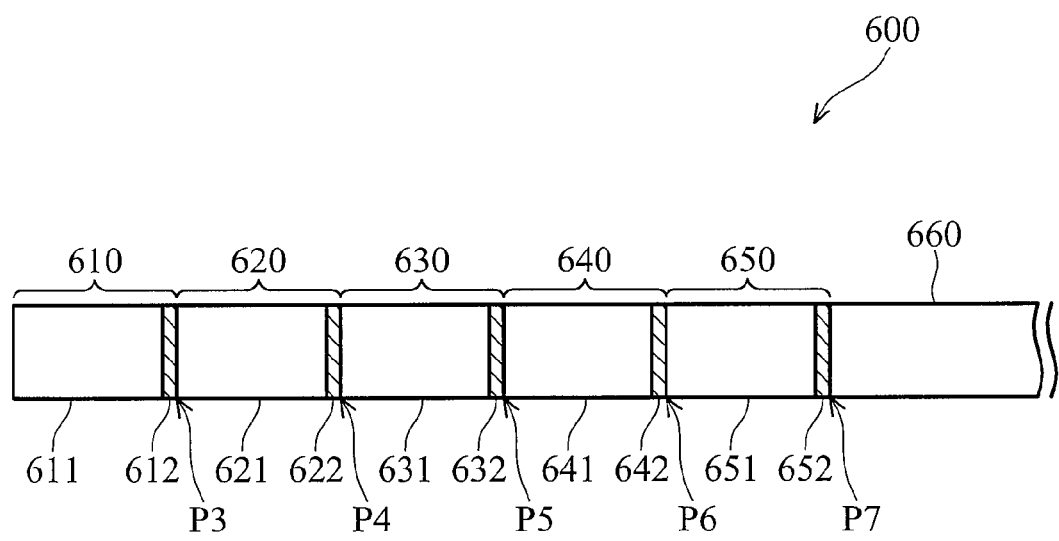
FIG. 6 is another schematic diagram of a writing data segment being written to a disc of the dynamic write strategy modification method according to a third embodiment of the invention.

Please refer to FIG. 6. FIG. 6 is another schematic diagram of a writing data segment 600 being written to a disc 810 of the dynamic write strategy modification method according to a third embodiment of the invention. Similar to the second embodiment, the write strategy modification method of the third embodiment modifies a specific pattern-independent parameter (e.g. write power, overdrive power, rough delay, cooling time). An optical system 800 first writes a plurality of data 610~650 into the disc according to a default write strategy WXR_I. After writing the data 650 at point P7, the optical system halts writing and reads back a plurality of sliced RF signals from the plurality of data 610~650 to modify the write strategy WXR_I, and continues to write another segment of data 660 to the disc at the point P7 according to a new write strategy WXR_II, which is the modified write strategy WXR_I. A detailed description of write strategy modification is provided in the following.

Taking the overdrive (OD) power as an example, when writing the plurality of data 610~650 in sequence, the optical system writes the data 611, 621, 631, 641, and 651 by utilizing a default OD power ratio OD_DEFAULT, and writes a plurality of short data 612, 622, 632, 642, 652 by utilizing different OD power ratios OD_1, OD_2, OD_3, OD_4, OD_5, respectively. After writing the data 650, the optical system halts writing at point P7 to read back the jitter values J_1, J_2, J_3, J_4, J_5 from the plurality of short data (612, 622, 632, 642, 652) and then finds a minimum value in these jitter values (J_1~J_5). For example, if the jitter value J_3 is minimum, then the optical system determines to utilize the corresponding OD power ratio OD_3 to replace the default OD power ratio OD. In other words, the optical system continues to write the data 660 at point P7 by utilizing the modified OD power ratio, which is equal to OD_3. Please note that, beside the jitter value, the present invention could use some other quality index, such as the mean edge deviations, the mean length deviations, edge deviations in rising and falling edge, PI error, or DC/DD jitter to modify the write strategy parameters.

Figure 7:
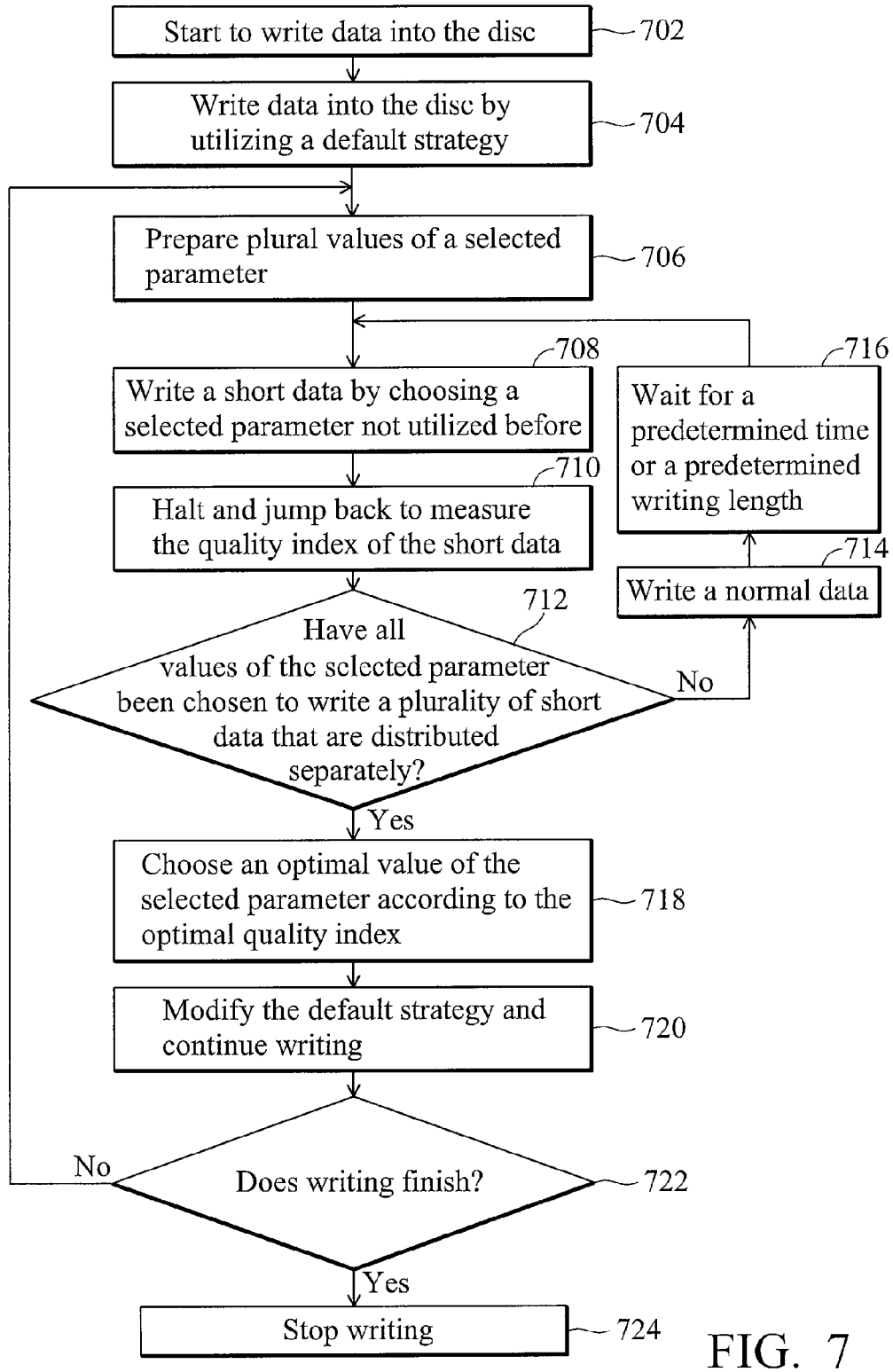
FIG. 7 is a flow chart of the dynamic write strategy modification method according to the third embodiment of the invention.

Please refer to FIG. 6 and FIG. 7 at the same time. FIG. 7 is a flow chart of the dynamic write strategy modification method according to the third embodiment of the invention. The detailed description is provided in the following.

Step 702: Begin writing data to the disc.
Step 704: Write data to the disc by utilizing a default strategy WXR_I.
Step 706: Prepare plural values of a selected parameter (e.g. OD power ratios OD_1, OD_2, OD_3, OD_4, OD_5).
Step 708: Write a short data by choosing a value of the selected parameter not utilized before.
Step 710: Halt and jump back to measure the quality index (e.g. jitter value) of the short data.
Step 712: Have all values of the selected parameter been chosen to write a plurality of short data that are distributed separately? If yes, go to step 718; otherwise, go to step 714.
Step 714: Write a normal data.
Step 716: Wait for a predetermined time or a predetermined writing length.
Step 718: Choose an optimal value of the selected parameter according to the optimal quality index (e.g. a minimum jitter value).
Step 720: Modify the default strategy WXR_I according to the optimal value of the selected parameter and continue writing at the point P7 by utilizing the modified write strategy WXR_II.
Step 722: If writing is finished, proceed to step 724; otherwise, go to step 706.
Step 724: Stop writing.

Compared with the related art, the dynamic write strategy modification methods of the invention modify the pattern dependent parameters according to a measuring result of short pattern combination (at least larger than 3 T), and the pattern independent parameters (e.g. write power). Hence, the data writing quality can be increased well.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dynamic write strategy modification method, comprising:
    writing data onto a disc according to a plurality of default write strategies, each default write strategy corresponding to a pattern combination;
    selecting a parameter of the default write strategies;
    determining a plurality of values of the selected parameter;
    writing data onto the disc separately according to different write strategies corresponding to the plurality of values, wherein each writing with the different write strategies is performed alternately with a writing with one of the plurality of default write strategies;
    stopping writing and measuring a quality index of the pattern combination of the written data;
    adjusting the default write strategies of the pattern combinations to generate a plurality of modified write strategies according to the quality indices; and
    resuming writing with the modified write strategies to write data;
    wherein the quality index is a mean rising edge deviation value, and a rising time difference $T_{diff}$ between a rising time $T_{top\_I}$ of the default write strategies and a rising time $T_{top\_II}$ of the modified write strategies corresponding to the mean rising edge deviation value ofs_top is shown in the following:

$$T_{top\_II} - T_{top\_I} = T_{diff} = X * \text{ofs\_top} + Y;$$

wherein X and Y are tunable variables.

2. The dynamic write strategy modification method of claim 1, wherein the pattern combination is a land/pit or pit/land combination, and is a combination of a short pattern wherein the short pattern comprises 3 T, 4 T and 5 T.

3. The dynamic write strategy modification method of claim 1, wherein the modified write strategies are generated by selecting an optimal value of the selected parameter corresponding to an optimal quality index.

4. The dynamic write strategy modification method of claim 1, wherein the parameters of the write strategy comprise one of: a rising time, a falling time, a write power, an overdrive power, a rough delay, and a cooling time.

5. A dynamic write strategy modification apparatus for an optical disc writing system having a pick up head for writing data to a disc, comprising:
    a write laser control module for controlling the pick up head to write data according to a plurality of default write strategies, each default write strategy corresponding to a pattern combination, selecting a parameter of the default write strategies, determining a plurality of values of the selected parameter, writing data onto the disc separately according to different write strategies corresponding to the plurality of values, wherein each writing with the different write strategies is performed alternately with a writing with one of the plurality of default write strategies; and
    stopping the writing and controlling the pick up head to read to data;

a measuring module for measuring a quality index of the pattern combination of the written data; and a write strategy development module for adjusting the default write strategies of the pattern combinations to generate a plurality of modified write strategies according to the quality indices;

wherein the write laser control module resuming writing with the modified write strategies to write data;

wherein the quality index is a mean rising edge deviation value, and a rising time difference $T_{diff}$ between a rising time $T_{top\_I}$ of the default write strategies and a rising time $T_{top\_II}$ of the modified write strategies corresponding to the mean rising edge deviation value ofs_top is shown in the following:

$$T_{top\_II} - T_{top\_I} = T_{diff} = X * \text{ofs\_top} + Y;$$

wherein X and Y are tunable variables.

6. The dynamic write strategy modification apparatus of claim 5, wherein the pattern combination is a land/pit or pit/land combination, and is a combination of a short pattern wherein the short pattern comprises 3 T, 4 T and 5 T.

7. The dynamic write strategy modification apparatus of claim 5, wherein the modified write strategies are generated by the write strategy development module by selecting an optimal value of the selected parameter corresponding to an optimal quality index.

8. The dynamic write strategy modification apparatus of claim 5, wherein the parameters of the write strategy comprise one of: a rising time, a falling time, a write power, an overdrive power, a rough delay, and a cooling time.

9. A dynamic write strategy modification method, comprising:

writing data onto a disc according to a plurality of default write strategies, each default write strategy corresponding to a pattern combination;

selecting a parameter of the default write strategies;

determining a plurality of values of the selected parameter;

writing data onto the disc separately according to different write strategies corresponding to the plurality of values, wherein each writing with the different write strategies is performed alternately with a writing with one of the plurality of default write strategies;

stopping writing and measuring a quality index of the pattern combination of the written data;

adjusting the default write strategies of the pattern combinations to generate a plurality of modified write strategies according to the quality indices; and resuming writing with the modified write strategies to write data;

wherein the quality index is a mean falling edge deviation value, and a falling time difference $T_{diff}$ between a falling time $T_{last\_I}$ of the default write strategies and a falling time $T_{last\_II}$ of the modified write strategies corresponding to the mean falling edge deviation value ofs_last is shown in the following:

$$T_{last\_II} - T_{last\_I} = T_{diff} = X * \text{ofs\_last} + Y;$$

wherein X and Y are tunable variables.

10. The dynamic write strategy modification method of claim 9, wherein the pattern combination is a land/pit or pit/land combination, and is a combination of a short pattern wherein the short pattern comprises 3 T, 4 T and 5 T.

11. The dynamic write strategy modification method of claim 9, wherein the modified write strategies are generated by selecting an optimal value of the selected parameter corresponding to an optimal quality index.

12. The dynamic write strategy modification method of claim 9, wherein the parameters of the write strategy comprise one of: a rising time, a falling time, a write power, an overdrive power, a rough delay, and a cooling time.

13. A dynamic write strategy modification apparatus for an optical disc writing system having a pick up head for writing data to a disc, comprising:

a write laser control module for controlling the pick up head to write data according to a plurality of default write strategies, each default write strategy corresponding to a pattern combination, selecting a parameter of the default write strategies, determining a plurality of values of the selected parameter, writing data onto the disc separately according to different write strategies corresponding to the plurality of values, wherein each writing with the different write strategies is performed alternately with a writing with one of the plurality of default write strategies; and stopping the writing and controlling the pick up head to read to data;

a measuring module for measuring a quality index of the pattern combination of the written data; and a write strategy development module for adjusting the default write strategies of the pattern combinations to generate a plurality of modified write strategies according to the quality indices;

wherein the write laser control module resuming writing with the modified write strategies to write data;

wherein the quality index is a mean falling edge deviation value, and a falling time difference $T_{diff}$ between a falling time $T_{last\_I}$ of the default write strategies and a falling time $T_{last\_II}$ of the modified write strategies corresponding to the mean falling edge deviation value ofs_last is shown in the following:

$$T_{last\_II} - T_{last\_I} = T_{diff} = X * \text{ofs\_last} + Y;$$

wherein X and Y are tunable variables.

14. The dynamic write strategy modification apparatus of claim 13, wherein the pattern combination is a land/pit or pit/land combination, and is a combination of a short pattern wherein the short pattern comprises 3 T, 4 T and 5 T.

15. The dynamic write strategy modification apparatus of claim 13, wherein the modified write strategies are generated by the write strategy development module by selecting an optimal value of the selected parameter corresponding to an optimal quality index.

16. The dynamic write strategy modification apparatus of claim 13, wherein the parameters of the write strategy comprise one of: a rising time, a falling time, a write power, an overdrive power, a rough delay, and a cooling time.

* * * * *